United States Patent
Kang et al.

(10) Patent No.: US 6,829,528 B1
(45) Date of Patent: Dec. 7, 2004

(54) CONTROL SYSTEM AND CONTROL METHOD FOR AUTOMATIC TRANSMISSION

(75) Inventors: Jihoon Kang, Shizuoka (JP); Yasutaka Kawamura, Shizuoka (JP); Tatsuo Ochiai, Shizuoka (JP); Hirofumi Okahara, Shizuoka (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 10/658,806

(22) Filed: Sep. 10, 2003

(30) Foreign Application Priority Data

Sep. 19, 2002 (JP) ........................................ 2002-273009

(51) Int. Cl.[7] .............................................. G06F 7/00
(52) U.S. Cl. .............................. 701/51; 701/54; 701/61
(58) Field of Search ............................... 701/51, 54, 56, 701/58, 60, 61; 477/34, 36, 38, 44

(56) References Cited

U.S. PATENT DOCUMENTS 6,104,976 A * 8/2000 Nakamura .................. 701/95
6,612,958 B2 * 9/2003 Imai et al. .................. 475/210
6,645,120 B1 * 11/2003 Nishio et al. ................ 476/10
6,691,012 B2 * 2/2004 Nishida et al. ............... 701/60

FOREIGN PATENT DOCUMENTS

JP          2735129 B2      1/1998

* cited by examiner

Primary Examiner—Richard M. Camby
(74) Attorney, Agent, or Firm—Foley & Lardner LLP (57) ABSTRACT

A control system for an automatic transmission (5) includes an oil pressure control mechanism (100) for supplying an oil pressure to the transmission (5), and sensor (28, 29) for detecting the oil pressure supplied from the oil pressure control mechanism (100) to the transmission (5). System controller (20, 21) calculates a maximum torque transmittable by the transmission (5) based on a speed ratio of the transmission (5) and the detected oil pressure; calculate an engine torque reduction amount from the difference between the torque being inputted into the transmission (5) and the maximum transmittable torque; and reduce the torque of an engine (1) according to the engine torque reduction amount.

6 Claims, 6 Drawing Sheets

CONTROL SYSTEM AND CONTROL METHOD FOR AUTOMATIC TRANSMISSION

This application claims priority from Japanese Patent Application 2002-273009, filed Sep. 19, 2002, which is incorporated herein by reference in its entirety.

BACKGROUND OF THE INVENTION

1. Field of the Invention

The present invention relates to a control for a vehicle having an automatic transmission.

2. Description of the Related Art

In an automatic transmission of a vehicle, a speed change mechanism is controlled by means of oil pressure from an oil pump driven by an engine. For example, in a V-belt continuously variable transmission (CVT), a V-belt is gripped by means of the oil pressure supplied to a primary pulley and a secondary pulley, to transmit a torque.

In a vehicle mounted with the V-belt CVT, when the vehicle is stopped for a long time at a cold place, it is not rare that an oil temperature of the transmission drops below −20° C. When the engine is started and the vehicle runs in this condition, the oil pressure is supplied to the primary pulley and the secondary pulley and speed change is performed as the vehicle speed rises. At this time, since a viscosity level of the operating oil is great, the supply pressure does not increase, and the force of the pulleys gripping the V-belt is insufficient, thus creating a possibility of slippage of the V-belt.

According to JP-2735129-B, published by the Japan Patent Office in 1998, when the oil temperature in the transmission decreases below a predetermined extremely cold temperature, a torque reduction is requested to the engine, and the engine output is restricted and the torque inputted into the transmission is reduced, to prevent the belt slippage.

SUMMARY OF THE INVENTION

However, the above-mentioned conventional example presumes the case where the transmission is operated with the oil pressure in the state of the lowest transmission oil temperature, and the torque reduction amount requested to the engine is a pre-set fixed value. Therefore, as the oil temperature rises, the engine torque reduction becomes excessive.

It is therefore an object of this invention to set the torque reduction amount to an appropriate amount, in the case where the engine torque is reduced when the oil temperature is the extremely cold.

According to the present invention, there is provided a control system for an automatic transmission, which includes an oil pressure control mechanism for supplying an oil pressure to the transmission, and a sensor for detecting the oil pressure supplied from the oil pressure control mechanism to the transmission. A controller of the control system calculates a maximum torque transmittable by the transmission based on a speed ratio of the transmission and the detected oil pressure, calculates an engine torque reduction amount from the difference between the torque being inputted into the transmission and the maximum transmittable torque, and reduces the engine torque according to the engine torque reduction amount.

Embodiments of the present invention, and merits of the present invention, are explained in detail below, with reference made to the attached drawings.

DETAILED DESCRIPTION OF THE PREFERRED EMBODIMENTS

Figure 1:
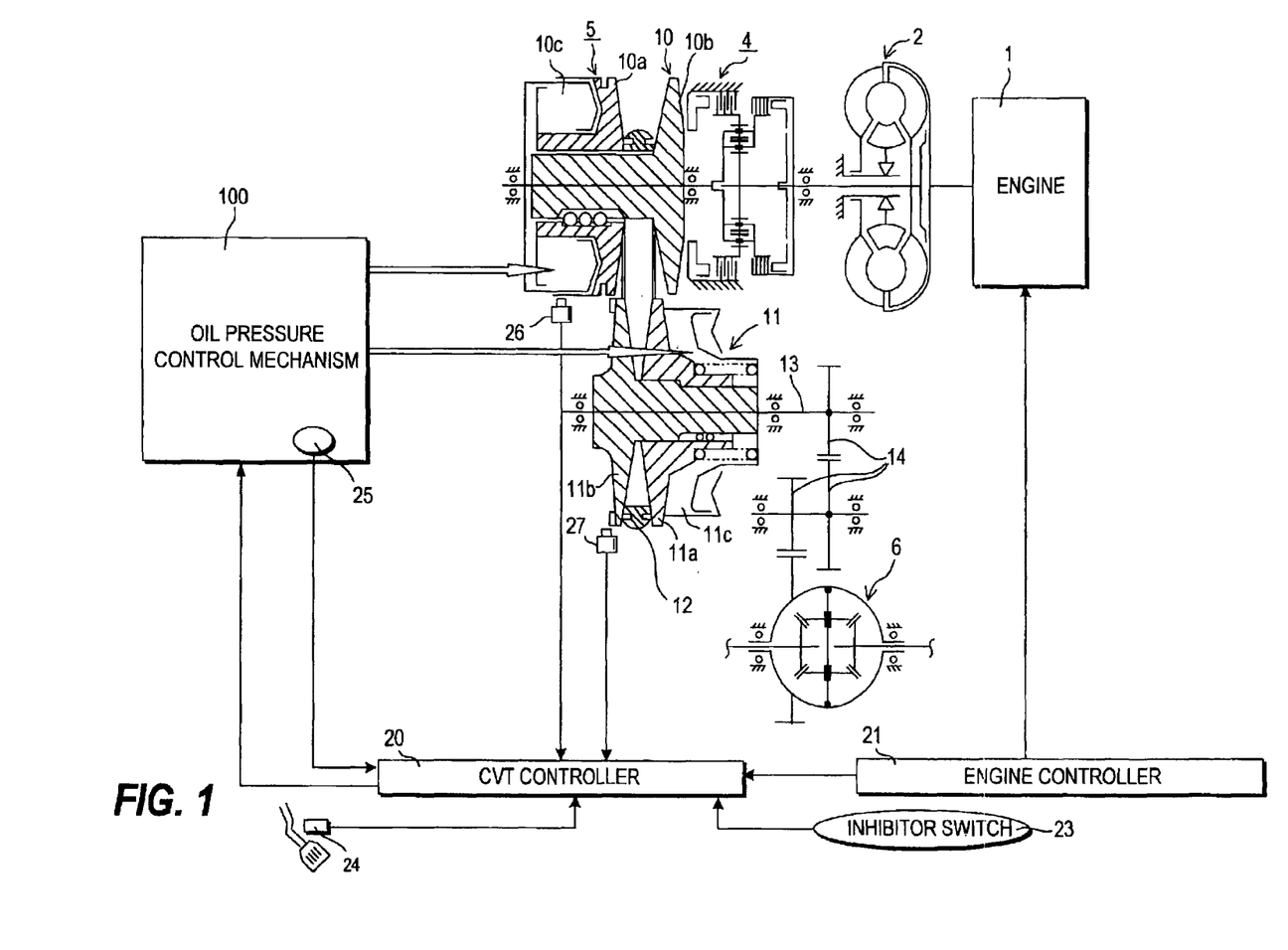
FIG. 1 is an outline constructional diagram of an automatic transmission control system according to the present invention.
Figure 2:
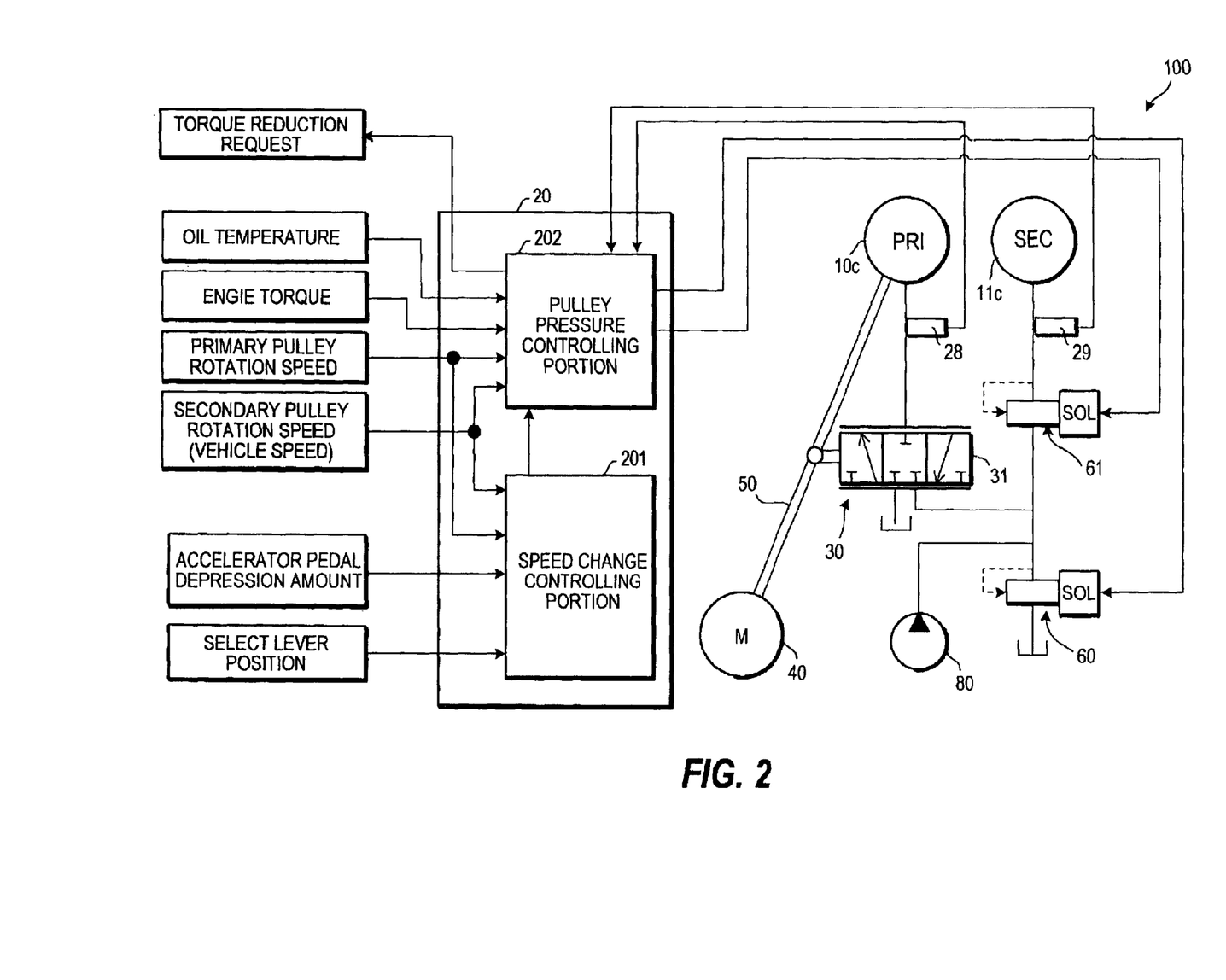
FIG. 2 is a block diagram of a CVT controller and an oil pressure control mechanism of the system.

FIG. 1 is a diagram showing an outline construction of an automatic transmission control system according to the present invention. FIG. 2 is a block diagram of an oil pressure control mechanism and a CVT controller of the system.

A V-belt continuously variable transmission (hereinafter, referred to as a CVT) 5 is connected to an engine 1, via a torque converter 2 with lockup clutch, and a forward/reverse changeover mechanism 4. The CVT 5 has a primary pulley 10 connected to an input axis, and a secondary pulley 11 connected to an output axis 13, and the V-belt 12 is wrapped around the pulleys 10 and 11. The output axis 13 is connected via an idler gear 14 and an idler shaft, to a differential gear unit 6.

A speed ratio of the CVT 5 and a contact friction force of the V-belt 12 are controlled by an oil pressure control mechanism 100. A CVT controller 20 determines a target speed ratio and contact friction force based on information relating to an input torque from an engine controller 21 controlling an engine 1, and detection signals from sensors described below, and outputs a command to the oil pressure control mechanism 100. Each controller 20 and 21 has a CPU, a memory and an input/output interface.

The primary pulley 10 includes a fixed conical plate 10b which rotates integrally with the input axis, and a moveable conical plate 10a which is arranged opposite the fixed conical plate 10b, forming a V-shaped pulley groove, and in response to oil pressure (a primary pressure) acting on a primary pulley cylinder chamber 10c, shifts toward the axis direction.

The secondary pulley 11 includes a fixed conical plate 11b which rotates integrally with the output axis 13, and a moveable conical plate 11a which is arranged opposite the fixed conical plate 11b and forms a V-shaped pulley groove, and in response to oil pressure (a secondary pressure) acting on a secondary pulley cylinder chamber 11c, shifts toward the axis direction.

The primary pulley cylinder chamber 10c and the secondary pulley cylinder chamber 11c are set to have equivalent pressure receiving areas.

A torque from the engine 1 is inputted, via the torque converter 2 and the forward/reverse changeover mechanism 4, into the CVT 5, and is transmitted via the primary pulley 10, the V-belt 12, and the secondary pulley 11 to the output axis 13. If the moveable conical plate 10a of the primary pulley 10 and the moveable conical plate 11a of the secondary pulley 11 are shifted toward the axis direction to change the contact radius of the V-belt 12, then the speed ratio of the CVT 5 can be continuously modified.

The speed ratio of the CVT 5 and the contact friction force of the V-belt 12 are controlled by the oil pressure control mechanism 100.

As shown in FIG. 2, the oil pressure control mechanism 100 has a regulator valve 60 for controlling a line pressure, a speed change control valve 30 for controlling the hydraulic pressure of the primary pulley cylinder chamber 10c (hereinafter, the primary pressure), and a pressure reduction valve 61 for controlling the pressure supplied to the secondary pulley cylinder chamber 11c (hereinafter, the secondary pressure).

The speed change control valve 30 is connected to a servo link 50 constituting a mechanical feedback mechanism. The speed change control valve 30 is driven by a step motor 40 connected to one end of the servo link 50, and receives a pulley groove width feedback—i.e., an actual speed ratio feedback—from the moveable conical plate 10a of the primary pulley 10 connected to the other end of the servo link 50.

A line pressure control system is constituted by the regulator valve 60 for adjusting the hydraulic pressure supplied from a hydraulic pump 80. The regulator valve 60, in response to a command from the CVT controller 20 (for example, a duty signal), adjusts a line pressure PL. The line pressure PL is supplied to the speed change control valve 30 controlling the primary pressure, and the pressure reduction valve 61 controlling the secondary pressure, respectively.

The ratio between the rotation speed of the primary pulley 10 and the rotation speed of the secondary pulley 11—namely, the speed ratio of the CVT 5—is controlled by the step motor 40 driven by the speed change command signal from the CVT controller 20. When the step motor 40 rotates, the servo link 50 shifts, and a spool 31 of the speed change control valve 30 is driven. As a result, the line pressure PL supplied to the speed change control valve 30 is adjusted to the primary pressure, and the pulley width is modified, thus realizing a predetermined target speed ratio.

The speed change control valve 30, in dependence on the position of the spool 31, shifts between supplying and withdrawing the oil pressure of the primary pulley cylinder chamber 10c, and adjusts the primary pressure so as to achieve the target speed ratio, which is indicated as the position the step motor 40. When the speed ratio reaches the target speed ratio, the spool 31 moves to a closed-valve position in response to the shift of the servo link 50.

Signals are inputted into the CVT controller 20 from: a rotation speed sensor 26 detecting a rotation speed of the primary pulley 10, a rotation speed sensor 27 detecting a rotation speed of the secondary pulley 11 (or vehicle speed), an oil pressure sensor 28 detecting a primary pressure acting on the primary pulley cylinder chamber 10c, an oil pressure sensor 29 detecting the secondary pressure acting on the secondary pulley cylinder chamber 11c, an inhibitor switch 23 detecting a select lever position, an accelerator pedal depression amount sensor 24 detecting an accelerator pedal depression amount, and an oil temperature sensor 25 detecting an oil temperature of the CVT 5. The CVT controller 20, based on these inputted signals, controls the speed ratio of the CVT 5 and the contact friction force of the V-belt 12.

The CVT controller 20 has a speed change controlling portion 201 for determining the target speed ratio according to the vehicle speed and the accelerator pedal depression amount, and driving the step motor 40 so that the speed ratio approaches the target speed ratio; and a pulley pressure controlling portion 202 for controlling the thrust of the primary pulley 10 and the secondary pulley 11 (the V-belt contact friction force) according to the input torque, the speed ratio, the oil temperature, and the speed change speed.

The pulley pressure controlling portion 202 determines the target value for the line pressure based on the input torque information, the speed ratio, and the oil temperature, and controls the line pressure by driving the regulator valve 60 solenoid. Further, the pulley pressure controlling portion 202 determines the target value for the secondary pressure, drives the pressure reduction valve 61 according to the detected value from the oil pressure sensor 29 and the target value, and performs feedback control on the secondary pressure.

When the oil temperature Temp of the CVT 5 is lower than a first low temperature TL1 (for example, TL1=−20° C.), the viscosity of the operating oil is high, and therefore the supply pressure does not rise. As a result, the primary pulley 10 and the secondary pulley 11 grip the V-belt 12 with insufficient force, and there is a possibility of the V-belt 12 slipping. Therefore, when the oil temperature Temp is lower than the first low temperature TL1, the pulley pressure controlling portion 202 requests the torque reduction to the engine controller 21, and decreases a torque of the engine 1 to prevent the V-belt 12 from slipping.

Specifically, if the detected oil temperature Temp is lower than the first low temperature TL1, then the pulley pressure controlling portion 202 calculates a torque capacity (the maximum transmittable torque) based on the oil pressure detected by the oil pressure sensor 29 (the secondary pressure) and the speed ratio (the pulley ratio), and also computes the CVT 5 input torque. Then, based on the difference between the input torque and the torque capacity, the torque reduction amount is determined, and a torque reduction request value is sent to the engine controller 21 (torque reduction request control).

When the engine controller 21 receives the torque reduction request, it reduces the torque of the engine 1, by reducing or cutting a fuel injection amount, or by retarding an ignition timing, or by reducing the throttle opening, or the like.

The torque reduction request control is performed when the oil temperature is between the first low temperature TL1 and a second low temperature TL2 (for example, −35° C.) which is lower than the first low temperature TL1. In other words, when the oil temperature is lower than the second low temperature TL2, the torque reduction request control is not performed.

The reason for this is that, in the condition where the oil temperature has dropped to an extremely low temperature of −40 to −50° C., the viscosity of the operating oil becomes extremely high, and when the speed change control is performed, the oil amount is significantly insufficient, and thus a large torque reduction becomes necessary. Therefore, when the detected oil temperature Temp is lower than the second low temperature TL2 which is lower than the first low temperature TL1, the CVT controller 20 does not perform the speed change control, but rather maintains a predetermined speed ratio, for example the speed ratio positioned furthest on the LOW side (i.e., the largest speed ratio). Further, the torque reduction request control is not performed.

Then, when the detected oil temperature Temp rises above the second low temperature TL2, the above-mentioned torque reduction request control is executed. The torque reduction request control is executed when the detected oil temperature Temp rises above the second low temperature TL2 because the viscosity of the operating oil decreases to some degree, and thus it is considered that the significant oil amount insufficiency will not occur.

Figure 3:
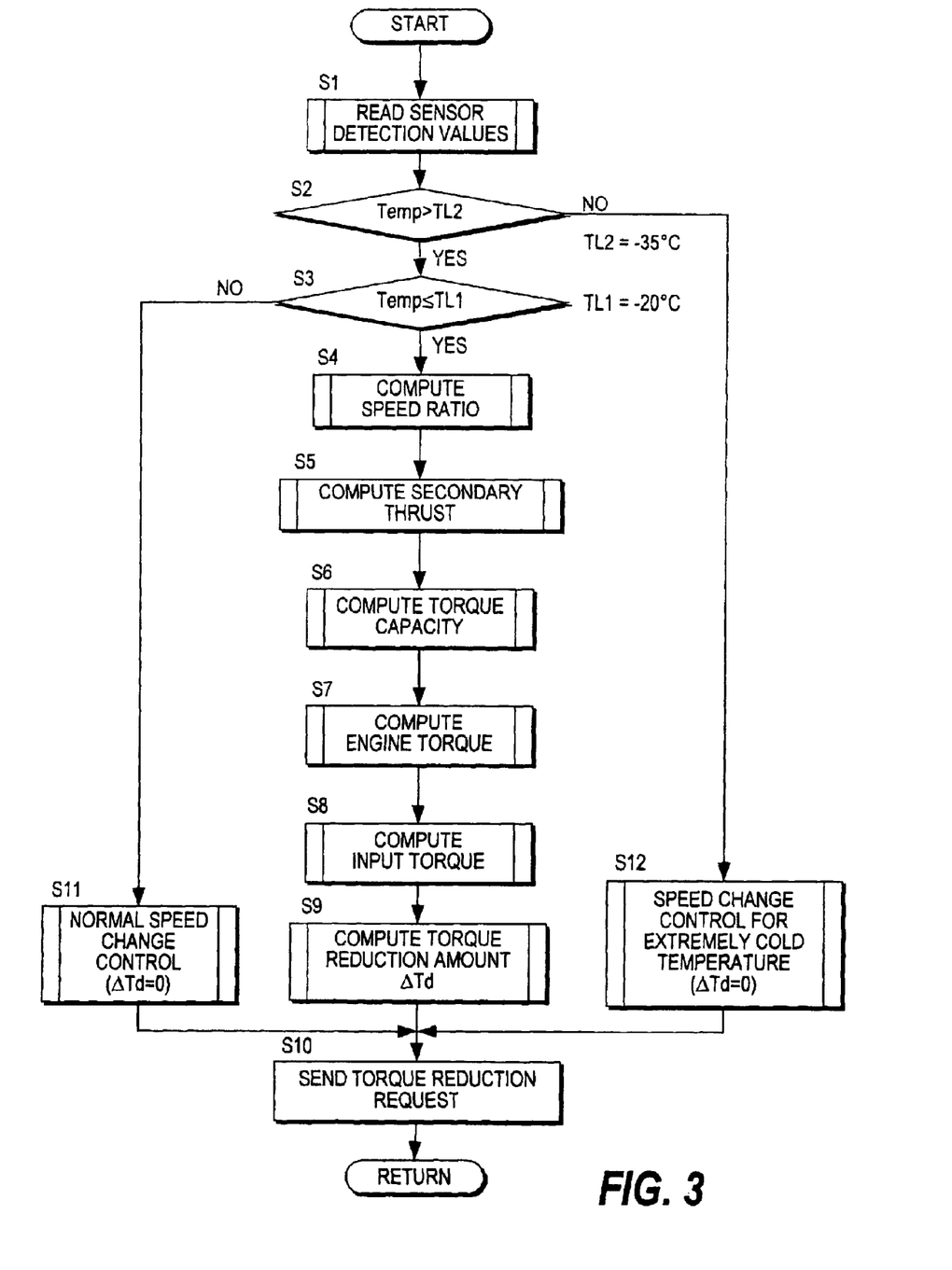
FIG. 3 is a flowchart showing a torque reduction request control preformed by the CVT controller.

Next, referring to a flowchart in FIG. 3, the torque reduction request control performed by the pulley pressure controlling portion 202 of the CVT controller 20 is explained. Note that, the flowchart in FIG. 3 is executed at predetermined cycles, for example, every few tens of msec.

First, in step S1, the oil temperature, the primary pulley rotation speed (the input axis rotation speed), the secondary pulley rotation speed (the output axis rotation speed, or the vehicle speed), and the secondary pressure, which are detected by the above-mentioned sensors, are read.

In step S2, it is determined whether the detected oil temperature Temp exceeds the second low temperature TL2 (for example TL2=−35° C.). If the detected oil temperature Temp exceeds the second low temperature TL2, then the procedure advances to step S3. In the case where the detected oil temperature Temp is lower than the second low temperature TL2, the procedure advances to step S12.

In step S3, it is determined whether the detected oil temperature Temp is lower than the first low temperature TL1 (for example, TL1=−20° C.). If the detected oil temperature Temp is lower than the first low temperature TL1, then the procedure advances to step S4, otherwise it advances to step S11.

In step S4, the CVT 5 speed ratio (or the pulley ratio) is computed from the ratio between the primary pulley rotation speed and the secondary pulley rotation speed.

In step S5, the detected secondary pressure is multiplied by the pressure receiving area of the an oil chamber 11c of the secondary pulley 11, to compute the thrust (secondary thrust) of the secondary pulley 11 to grip the V-belt 12.

Figure 4:
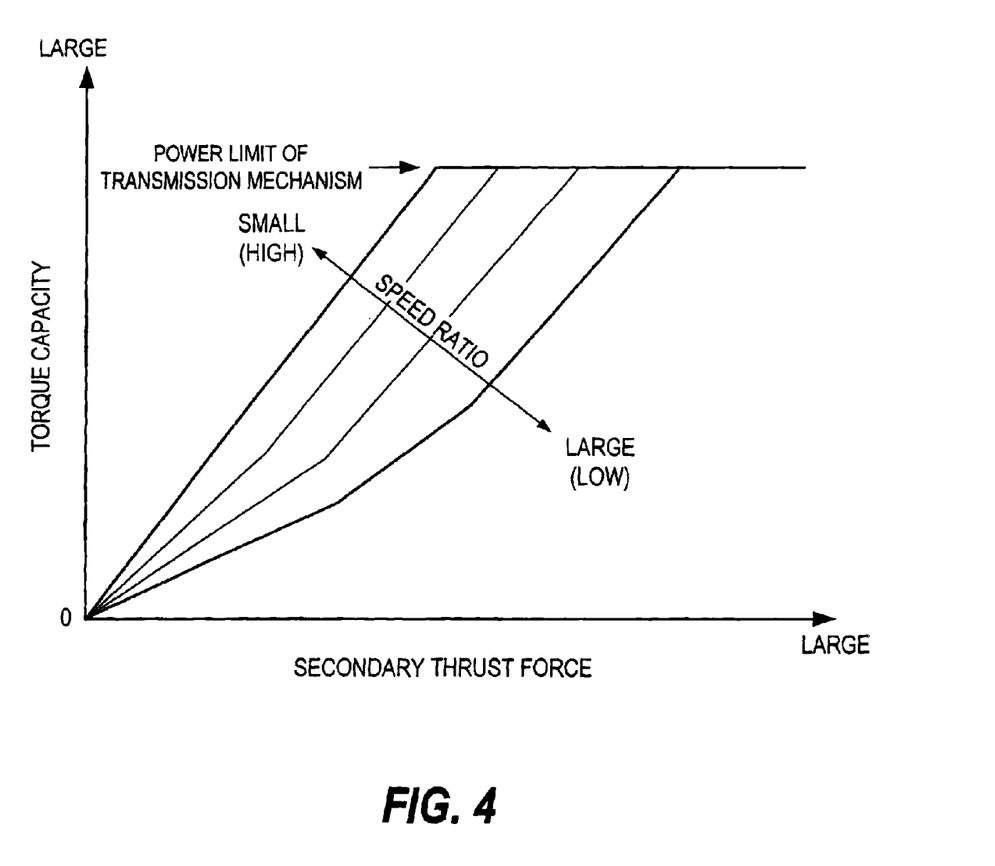
FIG. 4 is a map showing a relationship of a torque capacity to a secondary thrust and a speed ratio.

In step S6, a map shown in FIG. 4 is referenced, and based on the CVT 5 speed ratio and the thrust of the secondary pulley 11, the torque capacity of the CVT 5 is computed.

The map in FIG. 4 indicates the relationship of the torque capacity to the secondary thrust and the speed ratio. This map is set so that the torque capacity, which is determined in dependence upon the secondary thrust and the speed ratio, does not exceed a power limit of the transmission mechanism. A value produced by multiplying the torque capacity computed from the map by a predetermined safety rate may be used as the CVT 5 torque capacity. In such a case, the slippage of the V-belt 12 can be prevented more definitely.

Next, in step S7, the input torque information from the engine controller 21 is read, and the torque of the engine 1 is computed. The input torque information may be, for example, a target engine torque and an actual engine torque. Note that, when the input torque information includes a fuel injection pulse width (a fuel injection amount) and an engine rotation speed, the engine torque may be calculated based on these items of information. In a case where the engine characteristic map is available, the engine torque may be calculated from the accelerator pedal depression amount and the engine rotation speed. In this embodiment, the target engine torque is read from the engine controller 21 as the engine torque.

In step S8, the engine torque computed in the step S7 is compensated based on the converter status of the torque converter 2 and the operation status of the hydraulic pump 80, and the input torque which corresponds to the torque that is actually inputted into the primary pulley 10 is calculated.

In the converter state where the lockup clutch of the torque converter 2 is released, the engine output is compensated based on the torque ratio of the torque converter 2 to compute the input torque. In the lockup state, the engine output and input torque become equal.

Further, the torque expended to drive the hydraulic pump 80 is removed from the input torque. In a case where the hydraulic pump 80 is connected to the pump side (the engine side) of the torque converter 2, the torque required to drive the hydraulic pump 80 can be obtained from the engine rotation speed and the supply pressure (the line pressure), the oil temperature of the operating oil.

By compensating the engine torque by using the torque ratio of the torque converter 2 and the drive torque of the hydraulic pump 80, the torque that is actually inputted into the primary pulley 10 can be obtained.

Next, in step S9, the torque reduction amount is calculated from the difference between the torque capacity obtained in step S6, and the input torque obtained in step S8.

For example, assuming that the torque capacity is Tm, the input torque to the primary pulley 10 is Ti, and the safety rate is k (a constant), the torque reduction amount ΔTd can be calculated by means of the following formula.

$$\Delta Td = (Ti - Tm) \times k$$

In step S10, the torque reduction request is sent to the engine controller 21, in order to reduce the torque of the engine 1 by the torque reduction amount ΔTd.

On the other hand, in the normal speed change control in step S11, the oil pressure control and the speed change control can both be performed normally. Therefore, the torque reduction amount ΔTd is set to zero, and the procedure advances to step S10.

Further, in step S12, the target value for the line pressure is fixed at a predetermined value, and the speed ratio is fixed to the extreme value on the LOW side, or other such predetermined value (speed change is prohibited). Then, the torque reduction amount ΔTd is set to zero, which is the value that does not restrict the engine torque, and the procedure then advances to step S10.

According to the control described above, in the state where the oil temperature of the operating oil is low, the viscosity of the operating oil is high, and thus the oil amount necessary for speed change cannot be secured, the torque reduction amount ΔTd is determined based on the difference between the torque capacity obtained from the speed ratio and the secondary pressure, and the input torque. Accordingly, as compared to the case of the conventional examples in which the torque reduction amount is always set to a fixed value, the engine torque reduction amount can be modified in response to changes in the driving conditions, whereby preventing excessive torque reduction, and improving operational performance of the vehicle in the extremely low-temperature region.

Figure 5:
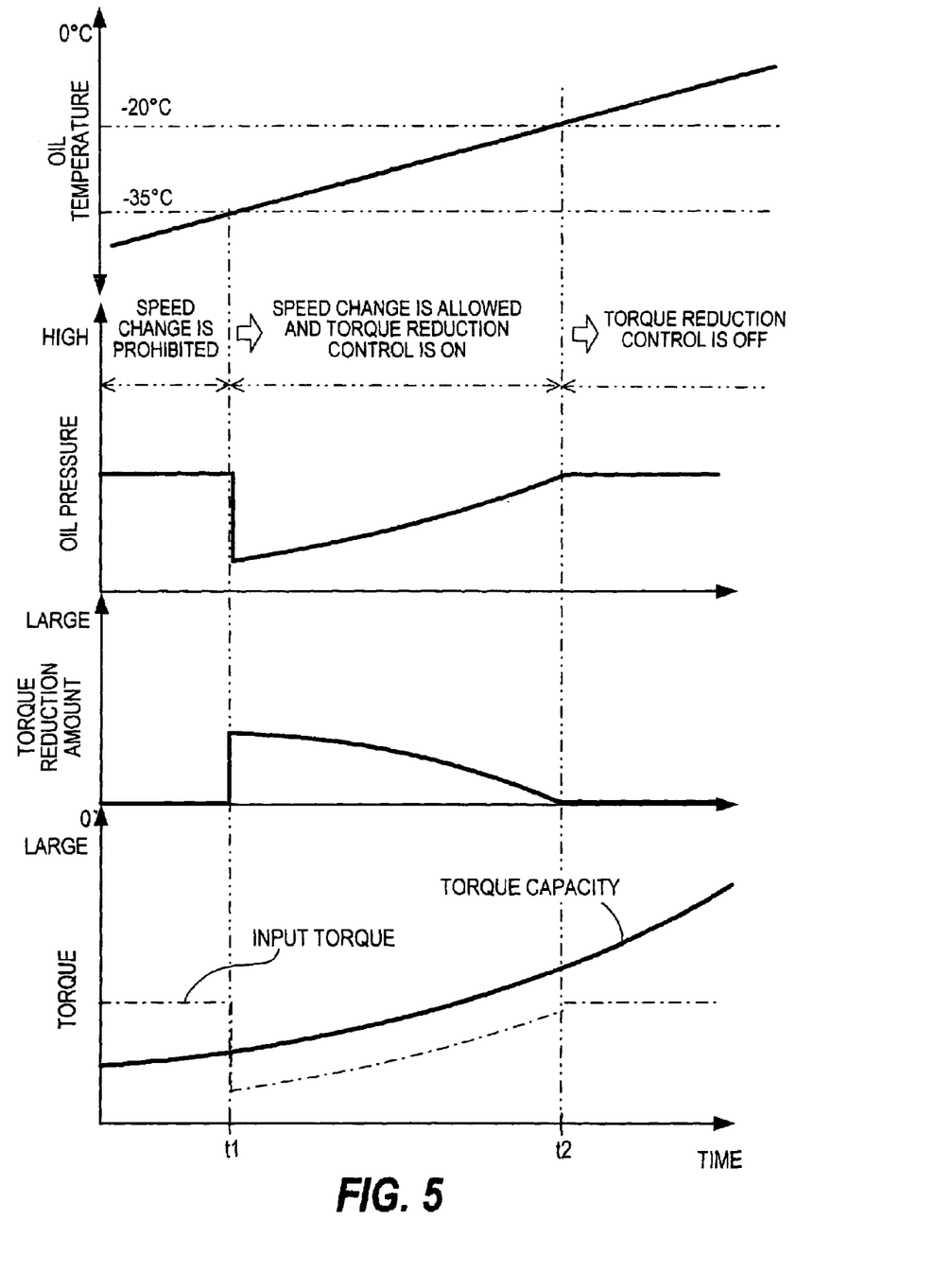
FIG. 5 is a time chart showing changes in the oil temperature, the torque reduction amount, the oil pressure, the input torque and the torque capacity. The time chart shows a case in which a vehicle starts at an extremely cold temperature.

For example, as shown in FIG. 5, in the case where the vehicle starts running in a state where the oil temperature is below −35° C., the oil viscosity is high and the oil amount necessary for the speed change cannot be secured. Therefore, speed change is prohibited, and then the vehicle starts running.

Subsequently, the engine 1 and the CVT 5 warm up, the oil temperature rises and the line pressure rises. At time t1, when the oil temperature exceeds the second low temperature (−35° C.), which is where the viscosity enables the oil amount needed for the speed change, the speed change control and the torque reduction request control are started.

At time t1, the torque reduction amount ΔTd obtained from the difference between the actual input torque and the torque capacity is calculated, the torque reduction amount ΔTd is sent to the engine controller 21, and the engine torque reduction control is started. Accordingly, the CVT 5 input torque is suppressed lower than the torque capacity, and the V-belt 12 slippage is prevented.

As the engine continues to operate the oil temperature rises, and as the supply pressure rises the torque capacity gradually increases, and the oil amount needed for the speed change control, and the capacity corresponding to the input torque can be easily secured. At this time, as the torque capacity increases, the torque reduction amount ΔTd gradually decreases. Therefore, the engine output is effectively used to run the vehicle, and the running performance can be improved as compared to the conventional examples in which the torque reduction amount was a fixed amount.

The oil temperature rises further, and at time t2, upon reaching the first low temperature TL1 (−20° C.) which is the upper limit temperature for performing the torque reduction request control, the torque reduction request control ends, and the normal speed change control is started. At this point in time, due to the rise of the oil temperature, the V-belt CVT torque capacity has become sufficiently great. Therefore, the normal speed change control can be performed without the V-belt 12 slipping.

Next, explanation is given of the second embodiment

Figure 6:
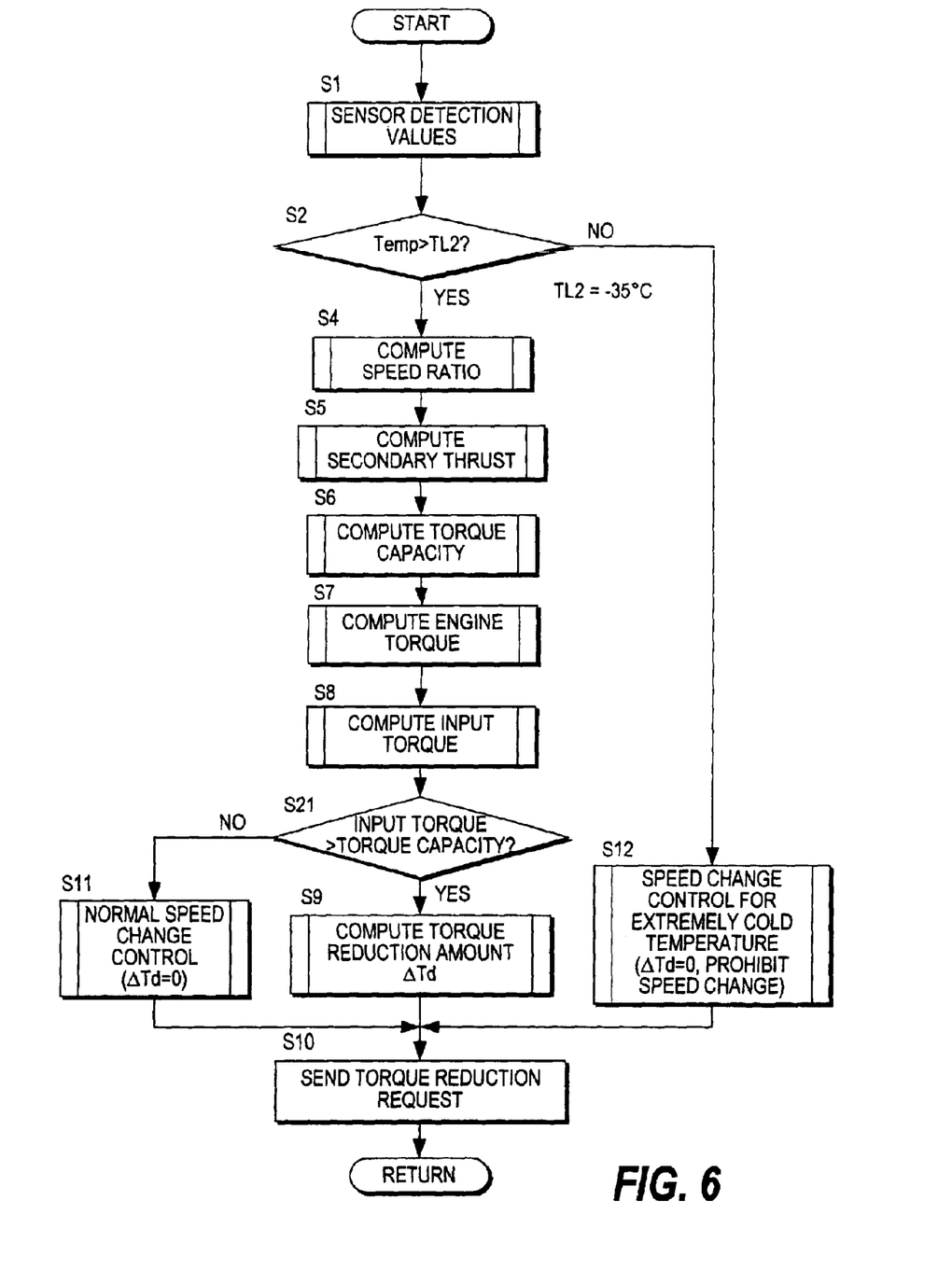
FIG. 6 is similar to FIG. 3, but it shows the second embodiment of the present invention.

FIG. 6 shows the second embodiment. Step S3 in FIG. 3 of the first embodiment is eliminated, which is to say that the upper-limit temperature is not provided for the torque reduction request control. Furthermore, step S21 for determining whether or not to execute the torque reduction request is added. The other constructions are similar to the first embodiment.

In steps S1 and S2, the sensor detection values are read, and it is determined whether the detected oil temperature Temp exceeds the second low temperature TL2 (for example, −35° C.). If the detected oil temperature Temp exceeds the second low temperature TL2, then the procedure advances to step S4. If the detected oil temperature Temp is lower then the second low temperature TL2, then the procedure advances to step S12, the speed ratio is fixed, and the torque reduction amount is set to zero.

In steps S4 through S8, the speed ratio, the secondary thrust, the torque capacity, the engine torque and the input torque are calculated, similarly to the first embodiment.

In step S21, it is determined whether the input torque exceeds the torque capacity. If the input torque exceeds the torque capacity, then the procedure advances to step S9, and the torque reduction request is performed in step S10. On the other hand, if the input torque is smaller than the torque capacity, then the V-belt slippage will not occur. Therefore, the procedure advances to step S11, and the normal speed change control is performed.

Due to this control, when the detected oil temperature Temp exceeds the second low temperature TL2, and the input torque exceeds the torque capacity, the torque reduction request control is performed, and the V-belt 12 slippage can be prevented. Therefore, the excessive torque reduction amount can be prevented not only at the extremely cold time, but also under all operating conditions, and thus the V-belt 12 slippage can be prevented more definitely.

Note that, each of the above-mentioned embodiments showed cases where the present invention is applied to the CVT 5. However, the present invention can also be applied to a step-automatic transmission constituted of friction elements and planetary gear mechanisms. In the case where the present invention is applied to the step-automatic transmission, slippage of the friction elements at cold temperatures due to insufficient oil amount can be prevented, and excessive torque reduction can be suppressed.

Further, the above-mentioned torque reduction request control may be combined with an engine rotation speed control. For example, when a select lever position signal is N-range or P-range, the CVT controller 20 sends out an engine rotation speed reduction request, so that the engine rotation speed does not exceed a pre-set value. Accordingly, the V-belt 12 slippage at a changeover from N or P-range to D-range and a changeover from N or P-range to R-range can be definitely prevented.

Further, in the above-mentioned embodiments, the hydraulic pump 80 for supplying the oil pressure to the CVT 5 is driven by the engine 1. However, the hydraulic pump 80 may also be driven by a motor.

What is claimed is:

1. A control system for an automatic transmission, comprising:

an oil pressure control mechanism which supplies an oil pressure to the transmission;

an oil pressure detection device which detects the oil pressure supplied from the oil pressure control mechanism to the transmission; and a controller which functions to:

calculate a maximum torque transmittable by the transmission based on a speed ratio of the transmission and the detected oil pressure;

calculate an engine torque reduction amount from the difference between a torque being inputted into the transmission and the maximum transmittable torque; and reduce a torque of an engine according to the engine torque reduction amount.

2. A control system according to claim 1, further comprising an oil temperature detection device which detects an oil temperature in the transmission, wherein the controller further functions to reduce the torque of the engine according to the engine torque reduction amount when the detected oil temperature is lower than a first low temperature.

3. A control system according to claim 1, wherein the controller further functions to reduce the torque of the engine according to the engine torque reduction amount when the torque being inputted into the transmission is greater than the maximum transmittable torque.

4. A control system according to claim 2, wherein the controller further functions to maintain the speed ratio of the transmission at a predetermined ratio when the detected oil temperature is lower than a second low temperature which is lower than the first low temperature.

5. A control system according to claim 1, wherein:

the transmission is a V-belt continuously variable transmission comprising a primary pulley, a secondary pulley, and a V-belt wrapped around the primary pulley and the secondary pulley, the V-belt being gripped based on an oil pressure supplied from the oil pressure control mechanism to the primary pulley and the secondary pulley;

the oil pressure detection mechanism detects at least one of the oil pressure supplied from the oil pressure control mechanism to the primary pulley, and the oil pressure supplied from the oil pressure control mechanism to the secondary pulley; and the controller further functions to:

calculate a thrust of at least one of the pulleys based on the detected oil pressure; and calculate the maximum transmittable torque from the calculated pulley thrust and the speed ratio of the transmission.

6. A control method for an automatic transmission connected to an oil pressure control mechanism for supplying an oil pressure to the transmission, the method comprising:

detecting the oil pressure supplied from the oil pressure control mechanism to the transmission;

calculating a maximum torque transmittable by the transmission based on a speed ration of the transmission and the detected oil pressure;

calculating an engine torque reduction amount from the difference between a torque being inputted into the transmission and the maximum transmittable torque; and reducing a torque of an engine according to the engine torque reduction amount.

* * * * *